United States Patent Office 3,113,071
Patented Dec. 3, 1963

3,113,071
RODENTICIDE FOOD BAIT CONTAINING ANTI-COAGULANT AND ANTIBACTERIAL AGENTS
Phillip H. Derse and Lloyd W. Hein, Madison, and Karl Paul Link, Middleton, Wis., assignors to Wisconsin Alumni Research Foundation, Madison, Wis., a corporation of Wisconsin
No Drawing. Filed Oct. 13, 1961, Ser. No. 144,858
4 Claims. (Cl. 167—46)

The present invention relates to the rodenticide field and more specifically to a novel rodenticide food bait containing as essential ingredients an anticoagulant rodenticide and an antibacterial agent. The bait composition can be used to destroy rodents including rats, mice and the like.

The rodent problem has been recognized as serious for many years. See Karl Paul Link Patent 2,687,365 with its reference to the U.S. Government estimates of the rodents' annual board bill, etc. See also Eadie, W. Robert, "Animal Control," The Macmilian Company, New York (1954); Link, Karl P., and Ross, Ward, Pest Control, August (1956); Pest Control, "Check up on House Mouse Control," August (1960). Also see Ross, Ward, and Flynn, C., Sanitary Maintenance, April (1960).

The anticoagulant rodenticides, unlike the quick-acting stomach poisons, e.g. strychnine, are multiple dose baits, i.e. a single dose does not kill. To be effective against rats, the rodenticide must be eaten by the rodents in multiple doses, i.e. they must eat the anticoagulant rodenticide over a period of at least several days, e.g. 3–6 days. Death of some rats usually takes place in about 3–5 days and with proper baiting most of the rats should be dead in about 10–14 days. In the case of mice and some species of rat, e.g. *Rattus rattus* (roof rat), however, control usually require longer periods of time. See copending application of Karl Paul Link, Serial No. 58,320, filed September 26, 1960, with its reference to the nibbling habits of mice. In view of this time lag, various attempts have been made to speed up the anticoagulant action and to destroy all rodent pests in an infestation in the shortest possible time. Increasing the amount of anticoagulant in the bait has been suggested, but does not solve the problem completely under all conditions.

The principal object of the present invention is to provide an improved anticoagulant rodenticide food bait which speeds up the rate of kill and increases the extent of kill.

Additional objects will be apparent as the description proceeds.

Our investigations have shown that both the rate and extent of kill can be increased by adding to the anticoagulant bait a small amount of an anti-bacterial agent. Representative results are shown in the illustrative examples below.

Example I

To about one ton of mixed grain (chicken feed) is added 0.5 pound of warfarin and 4 grams of penicillin-G, and the resulting mixture is thoroughly agitated and mixed to obtain a homogeneous mixture. To aid in obtaining a proper distribution of the warfarin and penicillin with the grain, it is generally preferred to replace a small portion of the grain with an inert, edible powdered carrier such as 50–100 pounds of corn starch, and to first mix the warfarin and penicillin with the carrier and then add this mixture to the grain with mixing. The resulting uniform product contains, by weight, about 0.025% of warfarin and about 0.00044% of penicillin. This mixture containing penicillin is designated below as product A–I.

For comparison purposes, a mixture using the same grain and 0.025% by weight of warfarin is prepared as described above. This mixture, containing no penicillin, is designated below as product B–I.

In tests with two groups of mice, using 17 mice in each group, the following results were obtained. In the group fed product A–I, at the end of 8 days, 10 mice were dead and at the end of 14 days, 16 mice were dead. In the group fed product B–I, at the end of 8 days only 5 mice were dead and at the end of 14 days, 11 mice were dead.

Example II

This example is in accordance with Example I, except that the penicillin in Example I is replaced by sulfaquinoxaline, to provide product A–II, by weight, with 0.025% of warfarin and 0.025% of sulfaquinoxaline. Comparison product, B–II, like product B–I, is formulated to contain only 0.025% by weight of warfarin.

In tests with two groups of albino mice, using 5 mice in each group, the following results were obtained. In the group fed product A–II, all mice were dead in 7 days, and in the group fed product B–II, all of the mice were dead in 11 days, i.e. the last of the mice did not die until the 11th day.

Example III

This example is in accordance with Example I, except that product A–III is prepared by adding about one pound of warfarin and 50 grams of terramycin to a ton of feed to provide a product containing, by weight, about 0.05% of warfarin and 0.0055% of terramycin. Comparison product B–III, containing no terramycin, is formulated to contain 0.05% by weight of warfarin.

In tests with two groups of hybrid black female mice, using 10 mice in each group, the following results were obtained. In the group fed product A–III, 7 mice were dead after 10 days and all mice were dead after 12 days. In the group fed product B–III, 4 mice were dead after 10 days and only 5 mice were dead after 12 days.

Example IV

This example is in accordance with Example II, except that product A–IV is formulated to contain, by weight, 0.00025% of warfarin and 0.025% of sulfaquinoxaline, and comparison product B–IV is formulated to contain only 0.00025% of warfarin.

In tests with two groups of 250 gram albino rats, using 4 rats in each group, the following results were obtained. In the group fed product A–IV, all rats were dead in 8 days. In the group fed product B–IV, only 2 rats were dead in 10 days, and 1 rat was still alive on the 24th day, when the test was terminated. This example, in which only about 1/100 of the recommended amount of warfarin was used in the bait, shows that the antibacterial agent, which per se has no deleterious effect on the animals, can be used to produce kills with extremely small amounts of anticoagulant.

In the above examples, the warfarin can be replaced with other anticoagulant rodenticides, illustrative examples of which are noted below. In the above examples, the antibiotics and sulfa drugs can be replaced by other antibacterial agents, illustrative examples of which are noted below. Mixtures of anticoagulant rodenticides and mixtures of antibacterial agents can also be used in the present invention.

The anticoagulant rodenticide of choice for use in the present invention is warfarin, 3-(α-acetonylbenzyl)-4-hydroxycoumarin, and its water-soluble derivative, warfarin sodium. Other anticoagulant rodenticides, however, can be used including phenprocoumon, 3-(α-ethylbenzyl)-4-hydroxycoumarin and its chloro derivative, 3-(α-ethyl-p-chlorobenzyl)-4-hydroxycoumarin; Coumachlor, 3-(α-acetonyl-4-chlorobenzyl)-4-hydroxycoumarin; Fumarin, 3-(α-acetonylfurfuryl)-4-hydroxycoumarin; Pival, 2-pivalyl-1, 3-indandione; PMP, calcium salt of 2-isovaleryl-1,3-indandione; Diphacinone, 2-diphenyl-acetyl-1,3-indandione, and the like. These rodenticide chemicals are blood anticoagulants and their action is unlike the old fast acting stomach poisons widely used prior to the discovery of the 4-hydroxycoumarin and indandione anticoagulant rodenticides. As for amounts, various percentages of anticoagulant can be used in the food bait with a range of about 0.0005–0.2% by weight, based on the edible food, being generally preferred. Optimum amounts for any particular combination can be readily ascertained by preliminary test.

Any antibacterial, bacteriostatic or bactericidal agent which, when taken orally, retards the growth and proliferation of bacteria in the gastro-intestinal tract of a rodent can be used in the present invention. Preferred examples include the well-known antibiotics and sulfa drugs of which the following are representative: the penicillins including penicillin-G and its salts, the tetracyclines including Aureomycin and Terramycin, chloramphenicol, etc., and sulfaquinoxaline, sulfapyrazine, sulfapyridine, sulfathiazole, sulfanilamide, etc. The antibacterial agent used need not be a bactericide or be used in amounts to be bactericidal. For purposes of the present invention, it is only necessary for the antibacterial agent to be used in amounts sufficient to reduce the activity of the organisms in the intestinal tract, including bacteria, which make or produce vitamin K or precursors of vitamin K. To accomplish this only very small amounts of antibacterial agent or mixtures of agents need be used. Four grams of penicillin-G per ton of rodenticide grain bait is an illustrative example. For most purposes the antibacterial agent is used in a range of about 0.0005–0.05% by weight based on the edible food in the bait. Larger amounts, however, can be used but are not recommended as excessive amounts of antibacterial agent perform no useful function. Optimum amounts for any particular antibacterial agent and bait can be readily ascertained by preliminary test.

The food used in the bait of the present invention can be any edible product such as, for example, cracked corn, corn meal, mixtures of various grains, e.g. mixtures of corn, oats and wheat; ground meat, and mixtures of meat and grain, etc. For purposes of safety, however, it is preferred to use a grain base bait which, while attractive to the rodent, is not as attractive to children and household pets as a bait containing meat or like edible products. The final bait mixtures can be used as such or be pelleted in accordance with standard practices in the art.

It is claimed:

1. A rodenticide food bait containing as essential ingredients, about 0.0005–0.2% by weight of an anticoagulant rodenticide selected from the group consisting of 4-hydroxycoumarin and indandione anticoagulant rodenticides and about 0.0005–0.05% by weight of an antibacterial agent which, when taken orally, retards the growth and proliferation of bacteria in the gastro-intestinal tract.

2. A rodenticide food bait consisting essentially of grain, about 0.025% by weight of warfarin and about 0.0005% by weight of penicillin-G.

3. A rodenticide food bait consisting essentially of grain, about 0.05% by weight of warfarin and about 0.0055% by weight of terramycin.

4. A rodenticide food bait consisting essentially of grain, about 0.025% by weight of warfarin and about 0.025% by weight of sulfaquinoxaline.

References Cited in the file of this patent

UNITED STATES PATENTS

| 2,687,365 | Link | Aug. 24, 1954 |
| 2,861,024 | Silver | Nov. 18, 1958 |

FOREIGN PATENTS

| 759,577 | Great Britain | Oct. 17, 1956 |

Disclaimer and Dedication

3,113,071.—*Phillip H. Derse* and *Lloyd W. Hein*, Madison, and *Karl Paul Link*, Middleton, Wis. RODENTICIDE FOOD BAIT CONTAINING ANTICOAGULANT AND ANTIBACTERIAL AGENTS. Patent dated Dec. 3, 1963. Disclaimer and dedication filed June 23, 1965, by the assignee, *Wisconsin Alumni Research Foundation*.

Hereby disclaims and dedicates to the public claims 1, 2, 3 and 4 of said patent.

[*Official Gazette September 28, 1965.*]